US008930324B2

(12) United States Patent
Blaine et al.

(10) Patent No.: US 8,930,324 B2
(45) Date of Patent: Jan. 6, 2015

(54) GUARDED FILE DESCRIPTORS

(76) Inventors: Russell A. Blaine, San Francisco, CA (US); Timothy P. Marsland, Half Moon Bay, CA (US); Benjamin H. Nham, San Francisco, CA (US); Adam C. Swift, San Jose, CA (US); Benjamin C. Trumbull, San Jose, CA (US); Umesh S. Vaishampayan, Santa Clara, CA (US)

( * ) Notice: Subject to any disclaimer, the term of this patent is extended or adjusted under 35 U.S.C. 154(b) by 154 days.

(21) Appl. No.: 13/620,733

(22) Filed: Sep. 15, 2012

(65) Prior Publication Data

US 2013/0339313 A1 Dec. 19, 2013

Related U.S. Application Data

(60) Provisional application No. 61/660,656, filed on Jun. 15, 2012, provisional application No. 61/663,501, filed on Jun. 22, 2012.

(51) Int. Cl.
| G06F 7/00 | (2006.01) |
| G06F 17/00 | (2006.01) |
| G06F 17/30 | (2006.01) |
| G06F 11/14 | (2006.01) |
| G06F 11/07 | (2006.01) |

(52) U.S. Cl.
CPC .......... *G06F 17/30371* (2013.01); *G06F 11/14* (2013.01); *G06F 11/0751* (2013.01)
USPC .......................................... 707/690; 707/701

(58) Field of Classification Search
None
See application file for complete search history.

(56) References Cited

U.S. PATENT DOCUMENTS

| 4,984,272 | A | * | 1/1991 | McIlroy et al. | .................. | 726/17 |
| 5,517,651 | A | | 5/1996 | Huck et al. | | |
| 5,815,729 | A | | 9/1998 | Henry et al. | | |
| 5,822,607 | A | * | 10/1998 | Henry et al. | .................... | 712/32 |
| 5,907,709 | A | * | 5/1999 | Cantey et al. | ................. | 717/141 |
| 6,145,094 | A | | 11/2000 | Shirriff et al. | | |
| 6,151,639 | A | | 11/2000 | Tucker et al. | | |
| 6,560,613 | B1 | * | 5/2003 | Gylfason et al. | ...................... | 1/1 |
| 6,732,211 | B1 | * | 5/2004 | Goyal et al. | ................. | 710/261 |
| 7,924,863 | B2 | | 4/2011 | Baruch | | |
| 2002/0112158 | A1 | * | 8/2002 | Golchikov | .................... | 713/164 |
| 2005/0060568 | A1 | * | 3/2005 | Beresnevichiene et al. | .. | 713/200 |

(Continued)

FOREIGN PATENT DOCUMENTS

| CA | 2427278 C * 2/2009 |
| EP | 2151995 A2 * 2/2010 |
| WO | WO 02082258 A2 * 10/2002 |

*Primary Examiner* — Augustine K Obisesan
(74) *Attorney, Agent, or Firm* — Womble Carlyle Sandridge & Rice, LLP

(57) ABSTRACT

Guarded file access operations are provided for creating and using guarded file descriptors, which can detect and prevent erroneous file access operations in computer programs. A file descriptor can be associated with a guard identifier to create a guarded file descriptor. The association can be established when the file is opened, and can be maintained independently of the computer program, which ordinarily maintains its own association between files, file descriptors, and guard identifiers. Subsequent file operations using the guarded file descriptor check that the guard identifier previously associated with that file descriptor is presented, and generate errors without performing the requested file operations if the correct guard identifier is not presented. This check serves as a validation of the computer program's use of file descriptors. An error and stack trace can be generated for use in analyzing a cause of the guard violation.

17 Claims, 5 Drawing Sheets

(56) References Cited

U.S. PATENT DOCUMENTS

| | | | |
|---|---|---|---|
| 2005/0172124 A1* | 8/2005 | Carpentier et al. | 713/165 |
| 2008/0229099 A1* | 9/2008 | Kim et al. | 713/160 |
| 2008/0306954 A1* | 12/2008 | Hornqvist | 707/9 |
| 2010/0130287 A1* | 5/2010 | Dasgupta | 463/44 |
| 2012/0078968 A1* | 3/2012 | Nixon | 707/792 |
| 2013/0318048 A1* | 11/2013 | Rajabi et al. | 707/687 |

* cited by examiner

GUARDED FILE DESCRIPTORS

CROSS REFERENCE TO RELATED APPLICATIONS

This application claims priority to U.S. Provisional Patent Application No. 61/660,656, filed Jun. 15, 2012, and entitled "GUARDED FILE DESCRIPTORS," and to U.S. Provisional Patent Application No. 61/663,501, filed Jun. 22, 2012, and entitled "GUARDED FILED DESCRIPTORS," both of which are incorporated herein by reference in their entirety and for all purposes.

BACKGROUND

1. Technical Field

The described embodiment relates generally to computer operations. More particularly, the described embodiment discloses guarded file descriptors used to prevent erroneous file operations and resultant data corruption.

2. Related Art

Computer based structured storage systems, such as computer file systems and database systems, have been remarkably successful at providing users with quick and easy access to enormous amounts of data. The importance of these structured storage systems in today's commerce is difficult to exaggerate. For example, structured storage systems have allowed businesses to generate and maintain enormous stores of persistent data that the company can modify and update over the course of years. For many companies, this persistent data is a valuable capital asset that is employed each day to perform the company's core operations. The data can be, for example, computer files (e.g., source code, word processing documents, etc.), database records and information (e.g., information on employees, customers, and/or products), and/or Web pages.

Applications can be built of many cooperating frameworks and libraries that share a dense namespace of file descriptors. The file descriptors take the form of a finite number of small integer values (enumerated as, for example, a 32 bit integer). These small integer values are used by a large family of application programming interfaces ("APIs") that manipulate kernel abstractions such as files, sockets, shared memory, etc. If a particular library or framework opens a file descriptor on a private object (e.g., a database file), it can be disadvantageous for other code to access the file descriptor prior to the completion of the operation, since the other code can perform operations that can accidentally damage data associated with the file descriptors, file locks, and the underlying objects that they represent. As another example, sometimes the application can be hosting a "plug in" written by a third party, in which case care must be taken in how such file descriptors to files containing critical content are handled, since that code may be more vulnerable to code injection or other security compromises. For example, if an application opens a database file, a file descriptor having a numeric value such as "3" is returned to the application. The application can then write data to the file by referencing that file descriptor value. However, if another portion of the application, such as the plug in, performs a file operation such as a write or close using the file descriptor value 3, whether inadvertently or intentionally, the contents of the file and information related to the file, such as file locks, can become damaged. Therefore, what is desired is a more robust file descriptor system that can prevent damaging of file descriptors and associated data such as file locks, and the underlying objects.

SUMMARY

The present application describes various embodiments regarding methods and apparatus for guarding against erroneous use of file descriptors when accessing or performing operations on files. In one or more embodiments, the guarded file descriptors disclosed herein can be used in a computer program to detect the use of incorrect file descriptor values in file operations (e.g., close, read, write, dup2) performed by the program, and further to identify the locations in the program code at which the file operations are invoked with the erroneous file descriptors. A file descriptor can be a parameter to a file operation, identifying a particular file on which the operation is to be performed, and can be thought of as a number that refers to an open file. In one aspect, a "guarded file descriptor" is a file descriptor that is associated with a "guard identifier," which can be understood as a value that is unique to that file descriptor, i.e., unique within the operating system process. The guard identifier can take the form of, for example, a large random number, such as a 128 bit universally unique identifier (UUID), which is expected to be a unique number. A computer program can create a guarded file descriptor using, for example, a program code operation with a name such as "guarded_open" that opens a file, creates a file descriptor for the file, associates a given guard identifier with the file descriptor, and provides the file descriptor to the invoking computer program. The value for the guard identifier can be a numeric value, and can be supplied to guarded_open by the invoking computer program. The program should use a different guard value for each file descriptor. The guard identifier can be recorded independently of the computer program, e.g., in a data table in memory, in association with the file descriptor, so that subsequent file operations can enforce the guard by checking whether the same guard identifier is provided by the computer program when the subsequent file operations are invoked, and generate errors without performing the actual operations if the same guard identifier is not provided by the computer program. Such guard errors can prevent execution of incorrect code, since program code that provides an incorrect guard identifier is likely to also provide an incorrect file descriptor, which can result in file data corruption. This guard checking serves as a validation of the computer program's use of file descriptors, e.g., by checking that the computer program has properly associated the guard identifiers with the guarded file descriptors. If the guard identifier previously associated with the file descriptor is not presented in subsequent operations on that file descriptor, the computer program may be invoking the file operation using a file descriptor that refers to a different file than the program intended. That is, an incorrect guard identifier can indicate that the program has not maintained a correct association between file descriptors and guard identifiers. A guard error and stack trace can be generated for use in analyzing a cause of the guard violation. Guard errors can also include a stack trace that can be used to identify the location in the program code that invoked the file operation incorrectly, which can be useful in diagnosing and fixing the error in the program code that erroneously invoked the file operation.

A method to guard against erroneous use of file descriptors in file operations is described. The method can be carried out by at least the following. An attempt is made to perform a file operation on a file descriptor, wherein the attempt comprises receiving the file descriptor and a guard identifier, determining whether the guard identifier is invalid for the file descriptor, and generating a guard violation in response to the guard identifier being, invalid for the file descriptor.

Embodiments can include one or more of the following features. Determining whether the guard identifier is invalid for the file descriptor can include searching a lookup table that associates valid guard identifiers with file descriptors for one or more associations between the file descriptor and the guard identifier, and determining that the guard identifier is invalid in response to the search finding no association between the file descriptor and the guard identifier in the lookup table. Determining whether the guard identifier is invalid can also include determining whether the file descriptor is applicable to the file operation, searching a lookup table that associates valid guard identifiers with file descriptors for one or more associations between the file descriptor and the guard identifier, and determining that the guard identifier is invalid in response to the file descriptor being applicable to the file operation and the search finding no association between the file descriptor and the guard identifier.

The method can also include determining that the file descriptor is applicable to the file operation in response to the file operation being associated with the file descriptor in a lookup table that associates file descriptors with operations to which the file descriptors apply. The file operation can be selected from one or more of the following operations: closing a guarded file descriptor, reading from a guarded file descriptor, writing to a guarded file descriptor, duplicating a guarded file descriptor, sending a guarded file descriptor over a socket, performing advisory locking on a guarded file descriptor, clearing a close-on-exec flag of a guarded file descriptor, or making a guarded file descriptor into a file port. Generating a guard violation can include logging an error in accordance with the guard violation, and logging the error can include logging pertinent state data about the file descriptor and the operation attempted on the file descriptor. The state data can include a stack trace identifying a location in program code of the attempt to perform the file operation. The error can include an exception code configured to describe the guarded operation, a guard identifier, and a file descriptor number.

The method can also include generating a guard exception in accordance with the guard violation, the guard exception including a guard exception code corresponding to the guarded operation. The exception code can be identified in accordance with one or more of the following guard exception codes: closing a guarded file descriptor, reading from a guarded file descriptor, writing to a guarded file descriptor, duplicating a guarded file descriptor, sending a guarded file descriptor over a socket, performing advisory locking on a guarded file descriptor, clearing a close-on-exec flag of a guarded file descriptor, making a guarded file descriptor into a file port, or invoking a guarded file descriptor operation with in incorrect guard identifier.

The method can also include using the exception to capture a program state in accordance with the guard violation, and using the captured program state to analyze a cause of the guard violation. The method can also include receiving a request to create a guard for the file descriptor prior to attempting to perform the file operation, the request including the file descriptor and the guard identifier, and associating the guard identifier with the file descriptor in a lookup table. The request can also include one or more operations to be guarded, and the method can also include associating the one or more operations with the file descriptor in the lookup table. The method can further include performing a guarded open operation on a file prior to attempting to perform the file operation, wherein performing the guarded open operation includes doing the following atomically: performing an unguarded open operation on the file descriptor, and associating the file descriptor with the guard identifier.

In another aspect, a method to guard against erroneous use of file descriptors in file operations is described. The method can be carried out by attempting to perform a file operation on a file descriptor, wherein the attempting comprises receiving, by the computer system, the file descriptor and a guard identifier. The method further includes determining whether the guard identifier is valid for the file descriptor, and performing, by the computer system, the file operation on the file descriptor in response to the guard identifier being valid for the file descriptor.

Embodiments can include one or more of the following features. Determining whether the guard identifier is invalid for the file descriptor can include searching a lookup table that associates valid guard identifiers with file descriptors for one or more associations between the file descriptor and the guard identifier, and determining that the guard identifier is valid in response to the search finding an association between the file descriptor and the guard identifier in the lookup table. Determining whether the guard identifier is valid can also include determining whether the file descriptor is applicable to the file operation, searching a lookup table that associates valid guard identifiers with file descriptors for one or more associations between the file descriptor and the guard identifier, and determining that the guard identifier is valid in response to the file descriptor being applicable to the file operation and the search finding an association between the file descriptor and the guard identifier.

In a further embodiment, a non-transitory computer readable medium for a computer system is described. The non-transitory computer readable medium includes computer program code that causes the processor to receive an invocation of a file operation on a file descriptor, receive a guard identifier associated with the invocation, determine that the guard identifier is associated with the file descriptor, the association established prior to receiving the invocation, and perform the file operation on the file descriptor in response to determining that the guard identifier is associated with the file descriptor.

Embodiments can include one or more of the following features. The computer program code that causes the processor to determine that the guard identifier is associated with the file descriptor can include computer program code that causes the processor to search a memory for one or more associations between the file descriptor and the guard identifier and to determine that the guard identifier is associated with the file descriptor in response to finding at least one association between the file descriptor and the guard identifier in the memory.

In another embodiment, a system is described. The system includes at least the following: a processing unit configured to attempt to perform a file operation on a file descriptor, wherein the attempting comprises receiving, by the computer system, the file descriptor and a guard identifier, determine that the guard identifier is associated with the file descriptor by a lookup table, determine that the file operation is not associated with the file descriptor by the lookup table, and prevent execution of the file operation in response to determining that the file operation is not associated with the guard identifier by the lookup table.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION OF EXAMPLE EMBODIMENTS

Figure 1:
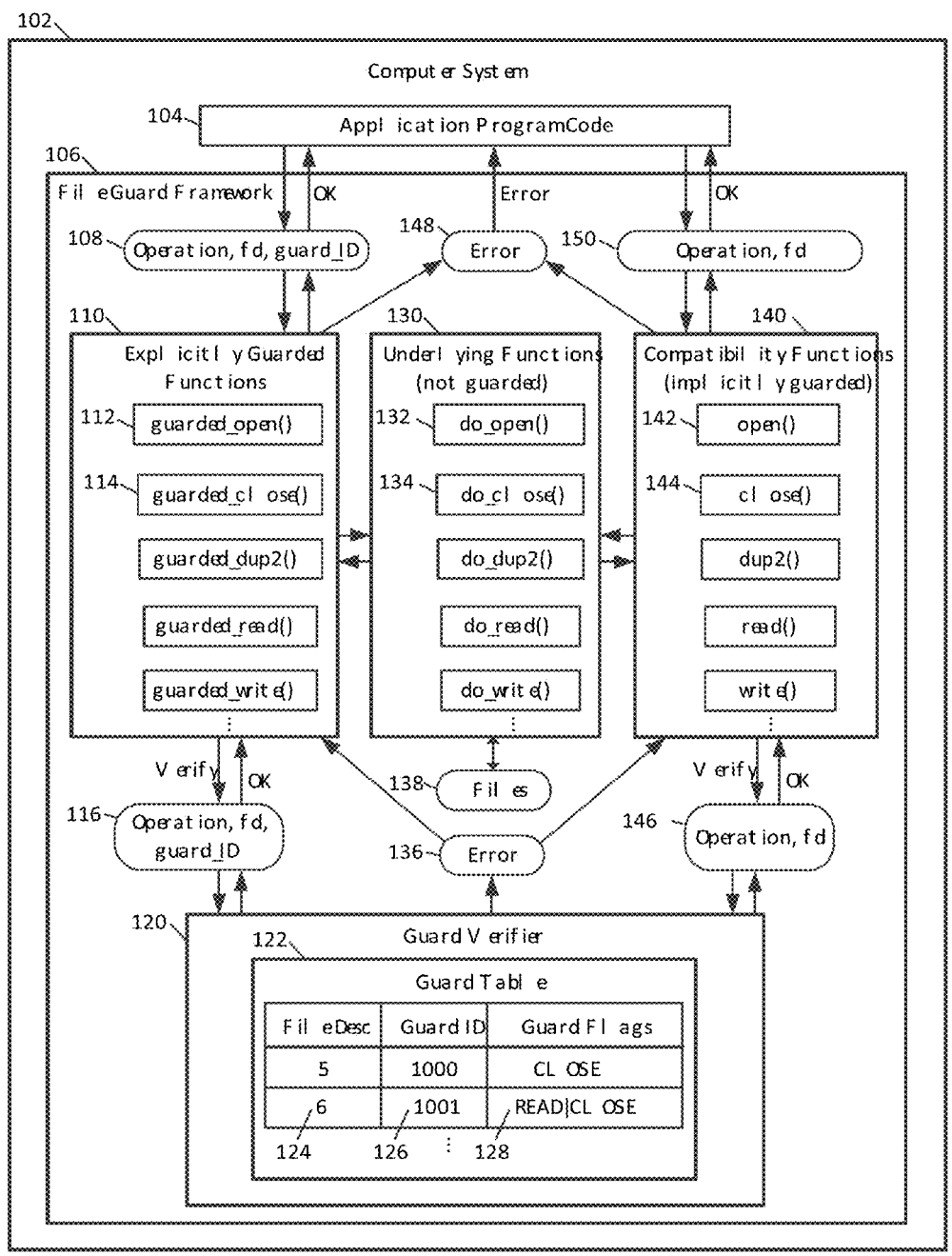
FIG. 1 is a block diagram showing a file descriptor guarding system in accordance with the described embodiments.

A representative apparatus and application of methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Computer programs read, write, and otherwise manipulate files and network sockets that are referred to using file descriptors. A file descriptor can be understood as a handle used by a process running a computer program to refer to an open file. For example, a process can pass a file name as a parameter to an open function or system call, which returns a file descriptor that can be used subsequently by the process to refer to the open file when performing operations such as read, write, close, and the like. A file descriptor is ordinarily valid during the lifetime of the process, and can be closed by the process using a close operation, after which further operations using, the file descriptor will not affect the file unless the file descriptor is re-opened. A file descriptor can be, for example, a numeric value such as 0, 1, 2, or the like. The computer program stores the file descriptor in memory, e.g., in a variable, and supplies the same memory location or variable when subsequently calling operations such as read, write, and close on the file.

File descriptors are ordinarily closed automatically and retired when the file is closed or the process terminates. However, if a (parent) process wants to create another (child) process, a call to one of a number of process-creation functions can be made. Some of the process-creation functions can include at least: fork( ), spawn( ), and so on. With many of these process-creation functions, the child can inherit the file descriptors of the parent. For example, if the parent had a file descriptor 8 in use for a particular file when the parent creates the child process, the child will also have file descriptor 8 in use for that same file. In other words, the child's file descriptor will have been duplicated from the parent's file descriptor. By inheriting the parent's file descriptor, at the file system manager level, the parent and child can have the same open control block (note: file descriptor inheritance can be prevented by using fcntl( )). Therefore, in the described embodiments, the child can inherit from the parent, the protection afforded using a guarded file descriptor.

A file descriptor can be associated with a file object which includes information such as the mode in which the file was opened and an offset pointer indicating where in the file the next operation will begin. The file descriptors are ordinarily managed by a process table for each process and embodied as integer numbers sequentially assigned by the operating system kernel. More particularly, as introduced above, file descriptors are ordinarily small integers corresponding to a file that has been opened by the current process. The integer identifies an open file within the process. For example, standard input (stdin) is usually file descriptor 0, standard output is 1, and standard error is 2. It should be noted that stdin as fd 0 can easily be muddled with a variable that has simply been initialized to zero—a very common but unfortunate occurrence when it also corresponds to a legal fd value. Additional files opened by a process will then be assigned 3, 4, 5, and so forth. The name "file descriptor" is slightly deceptive, as sockets, pipes, and devices are also referenced by file descriptors. Generally, a file descriptor is an index for an entry in a kernel-resident data structure containing the details of all open files. It should also be noted that the file descriptor space can be kept quite dense (i.e., reusing low numbered file descriptors can be required to conform to standards such as POSIX 1003.1). By requiring a dense file descriptor space, there remains the likelihood of amplifying the problems described herein.

Generally, an operating system (OS) can place limits on the number of file descriptors that a process may open. In addition to per-process limits, an OS can also have a global limit on the number of file descriptors that all its processes together may consume. For large programs that operate in a multi-threaded environment, the small pool of file descriptors can be used by more than one thread and can therefore be considered a shared resource in that the number of integers that can be associated with a file descriptor can be much less than the number of operations that require a file descriptor. In this way, the sharing of file descriptors can be problematic in situations (such as in a multi-threaded environment and/or large programs) where one thread inadvertently uses a file descriptor already in use.

There is a possibility that a computer program will use file descriptors incorrectly, e.g., by supplying an incorrect file descriptor as a parameter to a file operation. Programs that maintain multiple files are particularly susceptible to this problem, since an error in the program code can result in a file descriptor that refers to one file being used in an operation on a different file. For example, if a file descriptor refers to a database file, but a file write operation that writes logging information intended for a log file is mistakenly invoked with the database file's descriptor, then the log file information is stored in the database file, which results in an invalid, unusable database file because the log information is not in the proper format for data in the database file. In some cases, if a system file becomes corrupt because of such incorrect modification, the effects of the erroneous file operation can be severe, such as a system functioning incorrectly or crashing.

With the limited number of available integers that can be used as file descriptor values, operations such as write, read, close, can be easy to accidentally confuse or misuse. File descriptors can cover the entire scope of the program and can be used locally but can also be used to make global changes. For example, prior to initiating some operation within the program, one thread might close all or some critical subset of the file descriptors in the process. However, this action can have some adverse side effect such as undoing all file locks. This undoing, of all file locks can result in file corruption. For example, if part of a program is writing error logs to a file, and if the file is closed without the error logger knowing that the file has been closed, then the error logger is likely to start writing error information to the file, resulting in over-written data in the file and corrupting the file. One of the problems with conventional systems is that for large programs, these types of "bugs" can go unnoticed for a substantial amount of time and only become symptomatic when system files or other important files have been affected. Furthermore, the ordinary file operations such as read, write, and close, do not necessarily generate errors when an incorrect file descriptor is supplied, so erroneous use of file descriptors can be difficult to detect.

FIG. 1 is a block diagram showing a file descriptor guarding system in accordance with the described embodiments. A computer system 102 includes application program code 104 and a file descriptor guarding framework 106, both of which can be, for example, program code instructions that are encoded on a computer-readable medium and executable by a processor of the computer system 102. The guarding framework 106 can be implemented in a programming language such as C, C++, Objective C, Java™, or the like. The framework 106 provides a guarded file descriptor application programming interface (API), which includes program code functions that implement guarded file descriptors and can be called, i.e., invoked, by computer programs such as the application code 104. The application code 104 ordinarily executes in the same operating system process as at least a portion of the guarding framework 106. Portions of the guarding framework can also be located in operating system libraries, the operating system kernel, or in other portions of the computer system.

The file guard framework 106 includes functions 110, 130, 140 that correspond to operations that can be performed on files and other data-related entities, such as communication channels (e.g., network sockets). These file operations include opening, reading, from, writing to, and closing files, as well as other types of operations on file descriptors, such as accessing metadata, locking, duplicating file descriptors, and so on. The file operations are performed, subject to certain conditions as described herein, by the computer program functions 110, 130, 140 of the file guarding framework 106 in conjunction with the operating system. The functions 110, 130, 140 include compatibility functions 140, such as open 142, close 144, dup2, read, write, and so on, which have the same calling interfaces as the ordinary file access functions of the same names, but enforce guarded file descriptors. The compatibility functions 140 are referred to herein as "implicitly guarded functions," since they are subject to restrictions imposed by guarded file descriptors, but do not have explicit guard-related parameters, and can fail with errors when invoked on guarded file descriptors.

In one aspect, explicitly guarded functions 110 can perform their associated file operations on guarded file descriptors, subject to restrictions imposed by the guarded file descriptors, such as only executing the corresponding operation (e.g., read, write, close, or the like) if a valid guard identifier is provided as a parameter when an explicitly guarded function 110 is invoked on a guarded file descriptor. The explicitly guarded functions 110 accept a "guard identifier" parameter that is used by the file guarding framework 106 to determine whether to allow the explicitly guarded functions 110 to actually perform their associated file operations. The explicitly guarded functions include guarded_open, guarded_close, guarded_dup2, guarded_read, guarded_write, and so on.

In one or more embodiments, although the explicitly guarded functions 110 can fail with errors when invoked on guarded file descriptors, guard identifiers can be passed to the explicitly guarded functions to allow the operations to succeed. The explicitly guarded functions 110 and the compatibility functions 140 check whether the file descriptors on which they are invoked are guarded, and, if so, whether the guard applies to the specific operation. If a file descriptor is guarded (i.e., has been associated with a guard identifier) and applies to the operation being invoked (e.g., close), then the explicitly guarded functions 110 check if the guard identifier is valid (i.e., matches the guard identifier associated with the file descriptor), and, if so, perform their corresponding operations (e.g., closing the file) by invoking the corresponding underlying function 130 (e.g., do_close 134, or do_open 132 for an open operation). The underlying functions 130 are not exposed to the application program code 104, so that the application 104 does not directly invoke the underlying, functions 130. The underlying functions 130 implement the actual file operations, such as closing files. In one example, the underlying functions 130 do not check guards and do not generate guard errors, as the guard checking is performed before the underlying functions 130 are called by the framework 106. The underlying functions 130 can be implemented using the corresponding system calls such as open(2), close(2), and so on, but one or more of the underlying functions can have different names (do_open, and so on), since the system call names are used by the compatibility functions 140 to enforce guarded file descriptors for invocations made by the application 104, at least for the system calls for which guarded operations are defined. In other embodiments, the system calls such as open, close, and so on, are not guarded, and applications that wish to use guarded file descriptor features are expected to use the explicitly guarded functions 110 instead of the system calls.

In one or more embodiments, the application program code 104 invokes the explicitly guarded functions 110 using function calls in which parameters 108 are passed to the explicitly guarded functions 110. The parameters 108 include an indication of the operation to be invoked (which identifies the particular function 110 being called, such as guarded_open 112 or guarded_close 114), the file descriptor, and the guard identifier. The functions 110 pass these values as parameters 116 to a guard verifier 120, which determines whether the operation to be invoked is permitted according to the parameters 116 and a guard identifier 126 that is associated with the same file descriptor value 124 in a guard table 122. The guard table 122 also associates guard flags 128 with the file descriptor, e.g., CLOSE, READ, and the like, as well as combinations of multiple flags, as described in Table 1. In one example, the values in the guard table are created by the guarded_open function 112, which passes the file descriptor being opened (fd), the guard identifier, and the guardflags (which it receives as parameters from the application program code 104) to the guard verifier 120. The guard verifier searches the guard table 122 for a row having the file descriptor value (fd). If an entry (e.g., a row) is found in the guard table 122 having a file descriptor value 124 equal to the fd parameter, then the file descriptor is a guarded file descriptor, and the verifier 120 determines whether to permit the operation, or to prevent the operation by generating and/or returning an error or exception 136 as described below. If the value of the fd parameter is not present in the file descriptor column of the guard table 122, then fd is not a guarded file descriptor, then there is no guard checking to be done, and the guard verifier 122 returns an OK status, thus allowing the file operation to execute and access one or more of the files 138. Control passes back to the explicitly guarded functions 110, which execute the operation and return an OK status (or other status generated by the operation) to the application program code 104.

If the file descriptor in the parameters 116 is a guarded file descriptor, e.g., there is an entry in the guard table 122 having a the descriptor value 124 equal to the fd parameter, but the file descriptor does not apply to the requested operation, i.e., the operation in the parameters 116 is not in the guard flags column of the row that contains the fd, then the operation is permitted regardless of the guard ID 126 in the guard table 122, and an OK status is returned to the function 110. If the file descriptor on which the operation is requested does apply to that operation, i.e., the operation is in the guard flags column 128 of the row that contains the fd, then the operation on one or more of the files 138 is permitted if the guard_ID specified in the parameters 116 of the function matches the guard ID 126 stored in that row of the guard table 122, and the verifier 120 returns an OK status; otherwise, the guard_ID in the parameters 116 does not match that guard ID 126, in which case the operation is prevented and an error 136 is returned by the verifier 120. If the verifier 120 returns an error 136, then when control passes back to the explicitly guarded functions 110, the functions 110 also return an error 148 (based or having the same value as the error 136, but possibly having a different representation or structure) to the application program code 104 without executing the requested file operation.

In one or more embodiments, when the verifier 120 returns an error 136, the function that was called (e.g., one of the functions 110, 130, 140) returns an error status 148, e.g., by returning the value −1 and setting an error number status to EGUARDED. Further, the error 136 can cause an exception of type EXC_GUARD to be generated with a flag value set to kGUARD_EXC_CLOSE. Other actions are also possible in response to the error 136. For example, a signal can also be raised, the kernel can generate a log warning message, and the program 104 can exit in response to the error 136 (which the program 104 receives from the functions 110, 130, 140 as an error indicator 112). The error indicators 136, 148 can be represented as any of these types of errors or exceptions. It should be noted that another flavor of exception can result if the wrong guard is used, in the form of an EXC_GUARD exception with the kGUARD_EXC_MISMATCH flag. Furthermore, while EGUARDED is a useful and distinct error number for the purposes of this description, if the exception is caught or ignored, an overloaded error code will be returned, specifically EPERM. In this way, EGUARDED can be mapped to a pre-existing error code.

The compatibility functions 140 can consult the guard verifier 120 to determine if the file descriptor specified in parameters 150 is guarded and applies to the operation specified in the parameters 150, 146 in a way similar to that described above for the explicitly guarded functions 110, but the implicitly guarded functions 140 do not pass the guard identifier to the guard verifier 120, so invocations of the implicitly guarded functions 140 on guarded file descriptors will fail. Thus, if an implicit function 140 is invoked on a file descriptor that is protected by a guard identifier, the verifier 120 returns an error or exception 136, and the compatibility function 140 in turn returns an error 148 without executing the requested operation. Otherwise, if the file descriptor is not protected by a guard identifier, the requested operation is permitted, so the compatibility functions execute the requested operation and return an OK status (or other status generated by the operation) via the parameters 150 to the application 104.

In one or more embodiments, the guarded file descriptors disclosed herein can be used in a computer program to detect the use of erroneous file descriptor values in file operations performed by the program, and further to identify the locations in the program code at which the file operations are invoked with the erroneous file descriptors. As described above, a file descriptor is a parameter to the file operations, and can identify the particular file on which the operations are to be performed. In one aspect, a "guarded file descriptor" is a file descriptor that is associated with a "guard identifier," which can be understood as a value that is unique to that file descriptor. A computer program can create a guarded file descriptor using, for example, a program code operation with a name such as "guarded_open" that opens a file, creates a file descriptor for the file, associates a given guard identifier with the file descriptor, and provides the file descriptor to the invoking computer program. The value for the guard identifier can be a numeric value, and can be supplied to guarded_open by the invoking computer program, or can be generated by guarded_open. The guard identifier can be recorded, e.g., in a data table in memory, in association with the file descriptor, so that subsequent file operations can enforce the guard by checking whether the same guard identifier is provided when the subsequent file operations are invoked. Subsequent file operations that use the file descriptor can require that the same guard identifier be provided when the operations are invoked, and can generate errors without performing the actual operations if the same guard identifier is not provided. Such guard errors can prevent execution of incorrect code, since program code that provides an incorrect guard identifier is likely to also be providing an incorrect file descriptor, which can result in file data corruption. The guard errors can also include a stack trace that can be used to identify the location in the program code that invoked the file operation incorrectly, which can be useful in diagnosing and fixing the error in the program code that caused the incorrect file operation.

In this way, by providing a guarded close (or other appropriate guarded call), that can only be performed if an appropriate unique identifier is provided, such erroneous closes can be prevented. Furthermore, when an attempt to close a file fails due to the fact that only a guarded close invoked with an appropriate unique identifier can close the file, then a synchronous exception can be generated that allows capture in the stack trace where the guard violation is detected. If the exception is ignored, an interface can return an error code, and the operation (e.g. the close) fails. In this way, the specific portion (i.e., location) of the code that attempted to close the file erroneously can be identified. In this way, not only can the offending code be identified, but the likelihood of adversely affecting other parts of the program can be reduced since the number of erroneous closes (or other operations) can be substantially reduced along with the associated file descriptors.

In another aspect, guarded file descriptors can be configured to apply to some types of file operations but not to other types. The specific operations to which a guarded file descriptor applies can be specified when the guarded file descriptor is created using a flags parameter or other technique for specifying a set of operations. For example, if a guarded file descriptor is configured to apply to the file close operation but not to other operations, then a file close operation invoked using the guarded file descriptor will fail if the appropriate guard identifier is not supplied, but other operations, e.g., reading data from the file, will succeed regardless of whether the appropriate guard identifier is supplied.

The existing ordinary file descriptor-based functions, e.g., open, read, write, dup2, and so on, do not accept guard identifiers as parameters, so, in one or more embodiments, the ordinary functions fail when invoked with a guarded file descriptor. In other embodiments, the ordinary functions can be extended to accept guard parameters, e.g., using implicit parameters such as global variables or environment variables. For simplicity of explanation, the ordinary functions are described herein as not accepting guard parameters, and therefore not being capable of executing successfully when invoked on guarded file descriptors that apply to those functions.

In one or more embodiments, a set of guarded file descriptor functions is provided for use by application programs. These functions include a guarded_open function, which opens a file and creates a guarded file descriptor by associating a specified file descriptor with a given guard identifier, and several "explicitly guarded" functions for using the guarded file descriptor. The explicitly guarded functions include guarded_read, guarded_write, guarded_dup2, guarded_adv-lock, and others. Each of the explicitly guarded functions corresponds to an ordinary file descriptor-based function (e.g., read, write, dup2) with the addition of an explicit guard identifier parameter. The explicitly guarded functions accept a guard identifier parameter. Each of the functions only performs its file descriptor operation if the correct guard identifier is provided to the function when it is invoked. If the correct value is not provided, the function will fail with a guard error or exception (unless the guarded file descriptor does not apply to the operation type, as described below). In contrast, the ordinary file descriptor-based functions do not have a guard identifier parameter, and are therefore referred to as implicitly guarded functions. Guard checking is performed by the implicitly guarded functions in the same way as for the explicitly guarded functions, so when an implicitly guarded function is invoked on a file descriptor created by guarded_open, the function fails with an error if the guarded file descriptor applies to the type of function being invoked (i.e. the file descriptor is associated with the type of operation that is being invoked), since the implicitly guarded functions do not have guard identifier parameters, and the guard identifier therefore cannot be specified when the implicitly guarded functions are invoked. The explicitly guarded file operations accept a guard identifier as a parameter. In other embodiments, the explicitly guarded operations can accept the guard identifier as an implicit parameter, such as a global variable, environment variable, or by some other data passing technique.

As introduced above, the guarded file descriptor can apply to, i.e., guard, some or all of the file operations, such as the close, read, write, and dup2 operations, or just the close operation, or any other specified combination. The file operations that are to be guarded can be specified by, for example, supplying a guard flags parameter to the open operation, or using other ways to associate a set of operations with a file descriptor. In one example, the guarded_open function has a parameter named "guardflags" that specifies the operations to be guarded by the file descriptor created by the open operation. The guardflags parameter can be a numeric value in which each bit (i.e., flag) position corresponds to an operation in the set of possible operations. The set of guarded operations can be specified using, for example, a numeric value that has a bit that corresponds to each guardable operation, with the bits for the operations that actually are to be guarded being set to 1, and the other bits being set to 0. Flag names are provided for the operations, e.g., GUARD_CLOSE, GUARD_READ, GUARD_DUP2, and the like, which can be combined using an "or" operator. For example, the close and dup2 operations can be specified by invoking the guarded_open function as follows:

guarded_open(pathname, fileflags, guardid, GUARD_CLOSE|GUARD_DUP2);

Thus, in one embodiment, the program can specify which type(s) of operation(s), e.g., open, close, read, write, duplicate, fcntl, and so on, are to require a valid guard value, and the specified type of operation will be associated with the file descriptor in such as way as to require a valid guard value for the associated operation type(s). For example, a guarded file descriptor can be created using guarded_open, and the particular types of operations that are to be guarded can be specified in a "guardflags" parameter to the guarded_open function. In this example, operations of types that are not specified in the guarded_open call are not guarded, and can be executed without a guard identifier. An example list of guardable operations that can be specified in the guardflags parameter, with descriptions of the operations to which the guards apply, is shown below in Table 1.

In other embodiments, e.g., if the programming language supports function overloading, the explicitly guarded functions can have the same names as the ordinary (implicitly guarded) functions, and be distinguished by having different parameter signatures. For example, the explicitly guarded open function can have the signature open(char *pathname, int flags, guardid_t guardid, int guardflags), in which the difference in parameter names and types distinguishes the guarded operation from the ordinary operation (e.g., open (char *pathname, int flags)).

To use guarded file descriptors, a computer program such as an application program invokes the guarded open function (e.g., guarded_open) to open a file and associate a guard identifier value with the file descriptor. The guard identifier can be provided by the computer program, or can be generated by the guarded_open function and provided to the computer program as a result of the function. In other embodiments, the computer program itself can associate a guard value with the file descriptor after the guarded open function is complete, e.g., to create a guarded file descriptor based on a file descriptor created by a portion of program code that is impractical to modify.

In one or more embodiments, the computer program stores the guard value in memory in association with the file descriptor, e.g., in a lookup table if multiple file descriptors are in use simultaneously, and provides both the file descriptor and the guard value as parameters to subsequent invocations of the explicitly guarded functions to read or write data, duplicate file descriptors, close files, and the like. Since the ordinary implicitly guarded read, write, close, and duplication functions do not take guard values as parameters, the implicitly guarded functions generate an error without performing any file operations when invoked on a file descriptor that has previously been associated with a guard value (and, in one embodiment, the type of operation being invoked if the file descriptor is associated with specific operation types that were passed to guarded_open).

When invoking explicitly guarded functions for operations that were specified in the guardflags parameter to guarded_open, a program provides the guard identifier along with the corresponding file descriptor as parameters. The guarded file operation determines whether the guarded file descriptor is associated with the operation type of the invoked operation according to a guard table, and if so, verifies that the guard value provided by the program matches (e.g., is the same as or equal to) the guard value that was associated with the file descriptor when the file was opened, again according to the guard table. If the provided guard value is the same as the previously associated guard value, then the operation is permitted to execute.

Checking for the correct guard value addresses the problem of file descriptor values being erroneously specified and reused, because use of the incorrect guard value can be detected and reported as an error. The file descriptor guarding framework, a portion of which may be located in the operating system, checks the ordinary file descriptor functions, such as close, read, and write, to ensure that guarded file descriptors are only usable when the correct guard value is provided.

As indicated above, if a guarded file descriptor applies to an operation and the correct guard identifier is not provided to the function that invokes the operation, then the operation is not permitted, and an error is generated. That is, the function returns an error status without performing the requested operation. By default, the error (or exception) causes the program to halt, and can also cause a stack trace to be generated. In one embodiment, the guarded function, e.g., guarded_close, returns a value that indicates an error has occurred, and the calling program can retrieve details of the error, such as the type of error (e.g., invalid guard value), the expected and supplied guard values, a stack trace of the call in which the error occurred, and so on. In one embodiment, the default behavior when such an error occurs is for the program to be halted and details of the error be made available (e.g., a stack trace and other information, as described above), so that the source of the erroneous file descriptor operation can be identified.

Other behaviors are possible when the operation is not permitted because of an incorrect guard identifier. For example, the program can specify that guard errors are to be provided to the program, which will handle the errors, e.g., ignore the errors under certain conditions, attempt to recover from the errors under other conditions, and so on. The stack trace generated by the guard mismatch can be used to identify the location in the program code at which the operation that caused the mismatch was invoked.

The behavior of the program when guard errors occur can be implemented using signal handlers, exception handlers, or other error handlers. Since the requested file operation is not performed when a guarded function is invoked without the correct guard value, the program should not ordinarily continue execution without handling the error, since continued execution of the program may result in incorrect behavior, data corruption, or the like. However, the program can use error handlers as described above to catch invalid guard errors and continue execution, presumably handling the error in some way so that execution can safely continue. The guarded functions can return error status by, for example, raising an operating system signal, raising an exception, writing an error to a log file, or by taking some other action.

In one or more embodiments, a set of functions is provided for creating, using, and closing guarded file descriptors. These functions include guarded_open, guarded_dup2, guarded_read, guarded_write, and guarded_close, which are referred to herein as "explicitly guarded" functions, and perform operations similar to those of their ordinary counterparts (open, dup2, read, write, close, and so on), except the guarded functions each take a guard value parameter (named guardid), and the guarded_open function also takes a guard flags parameter (named guardflags), which specifies the operations that are to be guarded for the file descriptor created by the guarded_open call. That is, not all operations on file descriptors need be guarded, and the program can specify a subset of file descriptor operations (e.g., only close operations) that are to be guarded. In one or more embodiments, the ordinary counterparts (open, dup2, read, write, close, and so on) are extended to enforce the rules of guarded file descriptors, but the ordinary counterparts cannot perform operations on guarded file descriptors because the ordinary counterparts do not have guardid parameters. The ordinary counterparts are therefore referred to as "implicitly guarded" functions. The guard functions are described in more detail below.

In one embodiment, the guarded_open function opens or creates a file, and creates a guarded file descriptor that is guarded for a specified set of operations. The guarded_open function opens the file and creates the guarded file descriptor in a single atomic operation that is not interruptible by other file descriptor operations. That is, the guarded_open function atomically opens the file and creates the guarded file descriptor so that other threads or processes cannot execute between the time that the open bgis and the guarded file descriptor creation is complete. The function signature for guarded_open is int guarded_open(const char *pathname, int flags, const uuid_t *guardid, uint_t guardflags [, mode_t mode]);

The parameters are similar to those of the ordinary open(2) system call, i.e., the name of the file to open and flags that affect how the file is created and used, and an optional mode flag that defines file permissions if a file is being created. The guardid parameter is the guard value to be used in the guarded open operation. The data type of the guardid parameter is shown as uuid_t (i.e., a 128-bit QUID), but other types are possible, such as a long integer or a pointer to an array of bytes or characters. The guardflags parameter is an unsigned integer value that specifies the operations that are to be guarded for the file descriptor that is being created by the guarded_open call. The guardflags parameter can be specified by combining, the identifiers for the operations that are to be guarded with or operators. For example, if the close and dup operations are to be guarded, the guardflags parameter is specified as GUARD_CLOSE|GUARD_DUP. The guarded_open call returns the newly created file descriptor as a result, or −1 if an error occurred. In other embodiments, the guarded_open function can generate the guarded value instead of receiving the guarded value as a parameter. In still other embodiments, an application program can call the ordinary open(2) system call to create a file descriptor, and then call an add_guard function that creates a guard for the file descriptor, although the program should ensure that operations in other threads or processes do not simultaneously occur, as an inconsistent state could result. In one aspect, the guarded_open function itself is not guarded by a guarded file descriptor, because guarded_open creates file descriptors, and so there is no GUARD_OPEN flag. In other embodiments, the open function can be guarded, e.g., to detect calls to the open function on file descriptors that are already open, in which case the GUARD_OPEN flag can be specified in the guardflags parameter.

In one embodiment, the guarded_dup2 function duplicates a guarded file descriptor to produce another guarded file descriptor that is guarded by the same guard value. The ordinary dup2(2) does not support guards, and fails if called on a guarded file descriptor. The function signature for guarded_dup2 is:

int guarded_dup2(int oldfd, const uuid_t *guardid, int newfd);

The guarded_dup2 function behaves similarly to the dup2(2) system call, creating a new file descriptor with the given newfd value and returning the file descriptor value, except that the newly-created descriptor is also guarded via the same guardid, and the new file descriptor inherits the close-on-exec and close-on-fork settings from the original descriptor oldfd. If oldfd is a guarded file descriptor (e.g., GUARD_DUP was specified when oldfd was created), then guarded_dup2 compares the value of the guardid parameter to the guard identifier associated with oldfd. If the guardid parameter is not equal to the guard identifier associated with oldfd, then guarded_dup2 fails and returns an error.

In one embodiment, the guarded_socket function opens a socket and returns a guarded file descriptor for the socket. The guarded_socket function is similar to the guarded_open function, except that guarded_socket opens a socket and guarded_open opens a file, in other embodiments, guarded_open may open a socket as well as a file.

In one embodiment, the guarded_close function closes a file similarly to the ordinary close(2) system call, but guarded_close can be used to close guarded file descriptors. The ordinary close(2) does not support guards, and fails if called on a guarded file descriptor. The function signature for guarded_close is:

int guarded_close(int fd, const uuid_t *guardid);

The guarded_close function behaves similarly to the close(2) system call, but the guarded_close function can be used to close guarded file descriptors.

Certain operations performed by fcntl(2) can also be guarded, such as manipulation of the file descriptor when performing file and record locking. The operation of passing a file descriptor between processes can also be guarded, e.g., by causing the relevant sendmsg(2) call that attempts to send the file descriptor via a Unix domain socket without a valid guard value to fail with error number (errno) EGUARDED. The creation of a fileport from a descriptor can also be guarded, e.g., by causing the fileport_makeport(2) call that attempts to create the fileport without a guard value to fail with errno EGUARDED.

In one embodiment, the passing of file descriptors to child processes is not permitted when the close operation is guarded. That is, O_CLOEXEC must be specified as one of the flags in the guarded_open call when the close operation is guarded (e.g., guarded_open is called with guardflags that have the GUARD_CLOSE option set), so that the guarded file descriptor will be closed when an exec(2) call that creates a child process is executed.

In one or more embodiments, functions can be provided to convert non-guarded file descriptors to guarded file descriptors. For example, an add_guard(fd, guard_ID) function can be provided to add a guard to a file descriptor created by an ordinary open call, and remove_guard(fd, guard_ID) can be provided to remove a guard from a guarded file descriptor, thereby converting the guarded file descriptor to an ordinary, i.e., unguarded, file descriptor.

TABLE 1

| Operation flag | Description |
|---|---|
| GUARD_CLOSE | Guard the file close operation.<br>Explicit calls to close(2) on a guarded file guard will fail with EGUARDED and will generate an EXC_GUARD exception with flag kGUARD_EXC_CLOSE.<br>The descriptor is immutably set to be close-on-exec, and close-on-fork. Attempts to reset the FD_CLOEXEC flag using fcntl(2) will fail with EGUARDED.<br>Explicit close operations specified via posix_spawn_file_actions_addclose( ) with a GUARD_CLOSE-guarded fd will be honored, but only because the descriptor is implicitly marked close-on-exec.<br>Implicit close operations via exit(2) behave as if there were no guard.<br>Implicit close operations via close-on--exec or close-on-fork behaviors at fork( )/vfork( )/execve( )/pos ix_s pawn( ) time behave as if there were no guard.<br>Explicit attempts to call guarded_close(2) with the correct uuid behave as if there were no guard.<br>Explicit inherit operations specified via posix_spawn_file_actions_addinherit_np( ) with a GUARD_CLOSE guarded fd will cause the relevant posix_spawn(2) invocation to return EGUARDED.<br>Attempts to reset the FD_CLOEXEC flag using fcntl will fail with EGUARDED and will generate an EXC_GUARD exception with flag kGUARD_EXC_NOCLOEXEC. |
| GUARD_DUP | Guard the file descriptor duplication operations.<br>Explicit attempts to call dup(2), dup2(2), fcntl(2) with subcodes F_DUPFD_CLOEXEC and F_DUPFD or posix_spawn(2) after an explicit posix_spawn_file_actions_adddup2( ) on a guarded file descriptor will fail with EGUARDED. |
| GUARD_SOCKET_IPC | Guard the sending of file descriptors to other processes by sendmsg.<br>An attempt to send a guarded file descriptor via a Unix domain socket to another process will cause the relevant sendmsg(2) to fail with errno EGUARDED. Violations that result in the EGUARDED state will generate an EXC_GUARD exception with flag kGUARD_EXC_SOCKET_IPC |
| GUARD_FILEPORT | Guard the creation of fileports from file descriptors using fileport_makeport.<br>An attempt to create a fileport from a descriptor using fileport_makeport(2) will fail with errno EGUARDED. This will implicitly prevent the descriptor being sent to another process via a mach message (and implicitly, xpc message.) |

TABLE 1-continued

| Operation flag | Description |
| --- | --- |
| | In the initial implementation, GUARD_CLOSE must be specified with all of GUARD_DUP, GUARD_SOCKET_IPC and GUARD_FILEPORT set, also O_CLOEXEC must be specified; these restrictions may be relaxed in a future implementation. Violations that result in the EGUARDED state will generate an EXC_GUARD exception, with flag kGUARD_EXC_FILEPORT. |
| GUARD_READ | Guard read operations. The file descriptor cannot be read via read(2), readv(2), pread(2), aio_read(2) or sendfile(2). If attempted, the operation fails with error EGUARDED. Data may be read from the file descriptor using guarded_pread(2) with the descriptor guardid value iff the uuid matches, and the 'flags' setting would allow that e.g. O_RDONLY or O_RDWR. |
| GUARD_WRITE | Guard write operations. The file descriptor cannot be written via write(2), writev(2), pwrite(2), or aio_write(2). If attempted, the operation fails with errno EGUARDED. Data may be written to the file descriptor using guarded_pwrite(2) with the descriptor guardid value iff the id matches, and the 'flags' setting would allow that e.g. O_WRONLY or O_RDWR. |
| GUARD_META DATA | Guard operations that can change file metadata. Meta-data for the underlying file can no longer be manipulated via this descriptor i.e. fchmod(2), futimes(2), fchown(2) etc. all return EGUARDED (though the underlying metadata may change as a side-effect of other syscalls by this thread, or because of other activity on the system.) |
| GUARD_ADVLOCK | Guard file and record locking attempts by the fcntl operation. The file descriptor cannot be manipulated via fcntl(2) when performing file and record locking. guarded_advlock_np( ) is introduced to allow a set of F_SETLK/F_SETLKW/F_GETLK operations to be directly expressed. |

For example, a guarded file descriptor for a file with a given path name can be created by opening the file with the guarded_open function as shown below. The guard value, named guardid, is created by calling a generate_uuid( ) function that creates a unique value (i.e., a UUID). The guard flags parameter, which specifies the operations that are to be guarded for this file descriptor, are created as a numeric value that has bits set for the read, write, close, and duplicate operations.

int guardid=generate_uuid( );
    int guardflags=READ|WRITE|CLOSE|DUPLICATE;
    int guardedfd=guarded_open(pathname, flags, guardid, guardflags);

Subsequent calls to read, write, close, and duplicate (e.g., dup2) operations on the file descriptor guardedfd will result in an error unless the guardid value is passed to the appropriate guarded versions of the operations (e.g., guarded_read, guarded_write, guarded_close, and guarded_dup2). For example, guarded_close can be invoked as follows:

int result=guarded_close(guardedfd, guardid);

The guarded_close function call closes the file if the value of guardid is the same value that was passed to the guarded_open call that created guardedfd. Other guarded file operations use guards similarly, e.g., guarded_write, guarded_read, guarded_dup2, guarded_fcntl). Invoking the ordinary implicitly-guarded close(2) operation on guardedfd as shown below results in an error, with guardedfd not actually being closed, because the guard value (guardid) is not specified:

int result=close(guardedfd);

In one or more embodiments, guard_ID can be a pointer, in which the pointer should be non-NULL. The value of the guard identifier is not interpreted by the guarded file descriptor functions beyond comparison to other guard identifiers. The data type of the guard identifier may be a uuid_t universal unique identifier. In one embodiment, guard_ID can be code signature of the code issuing the open that can be found if and when an error occurs.

Figure 2:
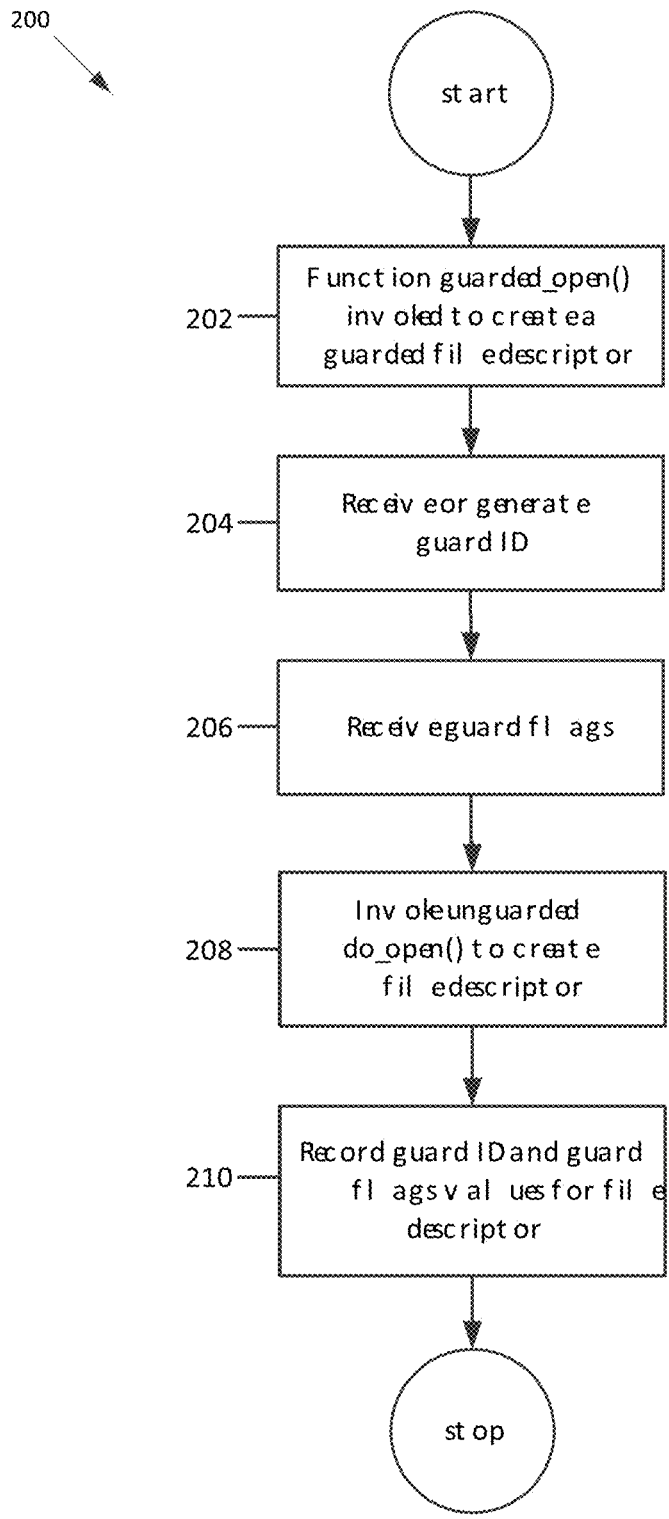
FIG. 2 shows a representative flow chart for a guarded file descriptor open process in accordance with the described embodiments.

FIG. 2 shows a representative flow chart for a guarded file descriptor open process 200 in accordance with the described embodiments. Process 200 can be implemented as, for example, computer program code encoded on a computer readable medium and executable by a processor of a computer system. Process 200 corresponds to and can be carried out by calling a guarded_open function 112 and can be carried out by calling the guarded_open function 112 at 202, e.g., from application program code 104, to create a guarded file descriptor 124. Block 204 receives or generates a guard identifier. Block 208 invokes the unguarded do_open function 132 to perform the open operation. The do_open function 132 opens a file using the given file descriptor, independently of any guards. Bock 210 records the guard identifier as the guard identifier and guard flags value received by the guarded_open function as the guardflags 128 in association with the file descriptor 124 received by the guarded_open function at block 202. For example, block 210 stores a (file descriptor, guard_ID, guardflags) tuple in the guard table 122 in a memory and/or other storage medium of the computer system, and the process ends. The guard identifier 126 can subsequently be used to grant access to the files 138 referenced by the file descriptors 124 to the explicitly guarded functions 110 for the operations specified in the guard flags 128.

Figure 3:
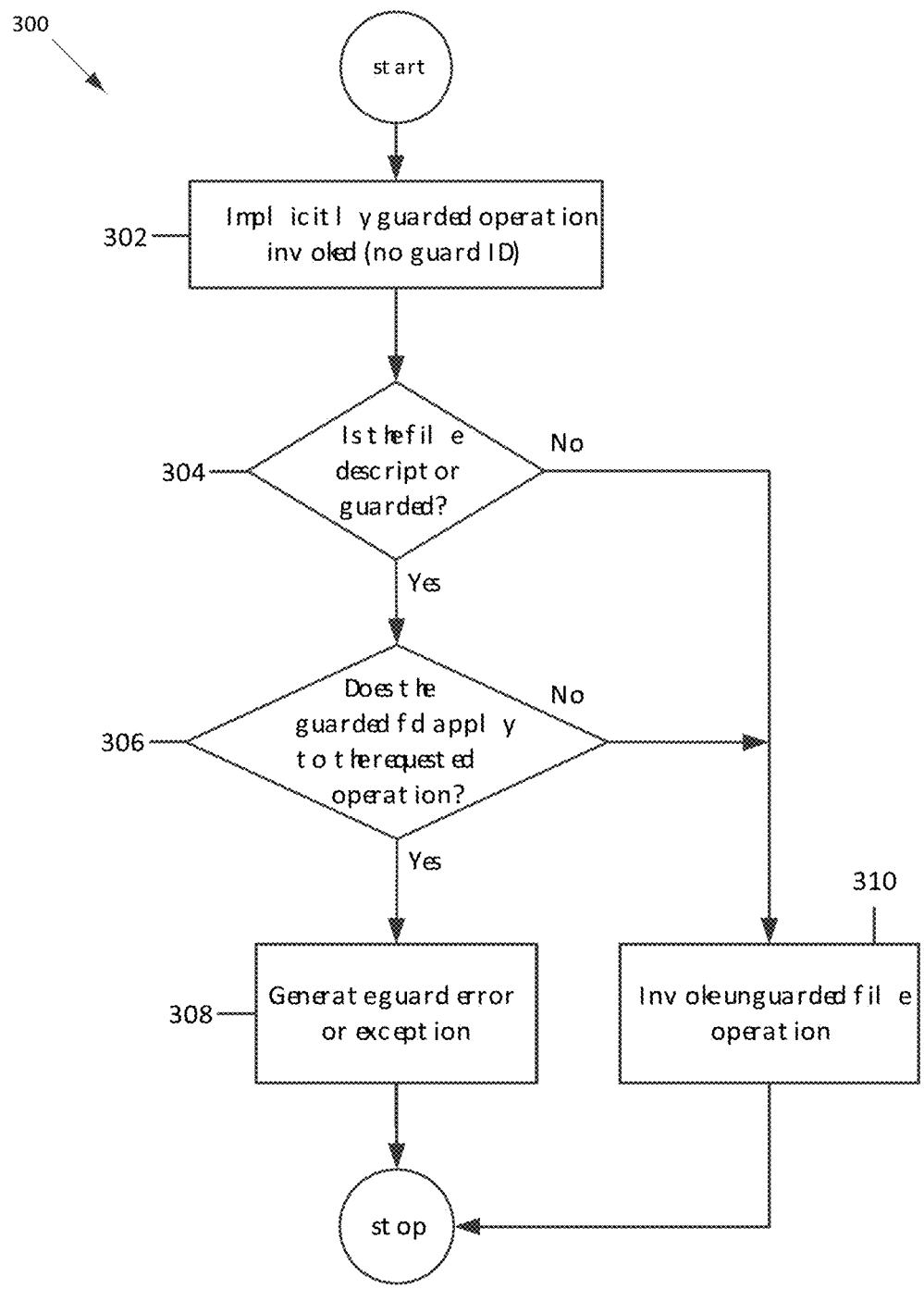
FIG. 3 shows a representative flow chart for an implicitly guarded file descriptor close process in accordance with the described embodiments.

FIG. 3 shows a representative flow chart for an implicitly guarded file descriptor operation process in accordance with the described embodiments. Process 300 can be implemented as, for example, computer program code encoded on a computer readable medium and executable by a processor of a computer system. Process 300 can describe an attempt to perform a file access operation on a file descriptor using a normal, i.e., implicitly guarded, function 140 such as a system close function 144. In this case, process 300 can be used to capture an exception and generate an error code by the implicitly guarded function 140. Process 300 can be carried out when an application program attempts to close a file descriptor using the implicitly guarded function 140 such as the system close function 144 at 302. Block 304 determines whether the file descriptor is a guarded file descriptor. The determination at 304 can be made by searching a guard table 122 for the file descriptor and determining if a guard identifier 126 is associated with the file descriptor 124. If there is no record of the file descriptor, i.e., the file descriptor is not present in the file descriptor column 124 of the guard table 122, then the file descriptor is not a guarded file descriptor in the current operating system process, and control transfers to block 310. Alternatively, if there is a record of the file descriptor in the guard table 122, e.g., an association exists between the file descriptor 124 and a guard identifier 126, then control transfers to block 306.

Block 306 determines whether the guarded file descriptor that was passed to the close function at block 302 applies to the requested operation (e.g., close) by determining whether the flag corresponding to the operation (e.g., GUARD_CLOSE) is set in the recorded guardflags 128 associated with the file descriptor 124. If block 306 determines that the flag is set, i.e., the guarded file descriptor applies to the close operation, then block 308 generates a guard error or exception 136, e.g., by raising a signal or returning an error code or exception from the close operation. If block 304 determines that the file descriptor is not guarded, or block 306 determines that the operation flag is not set, so that the guard is not applicable to the operation, then block 310 invokes the unguarded do_close function 134 to close the file descriptor without any further guard checking.

Figure 4:
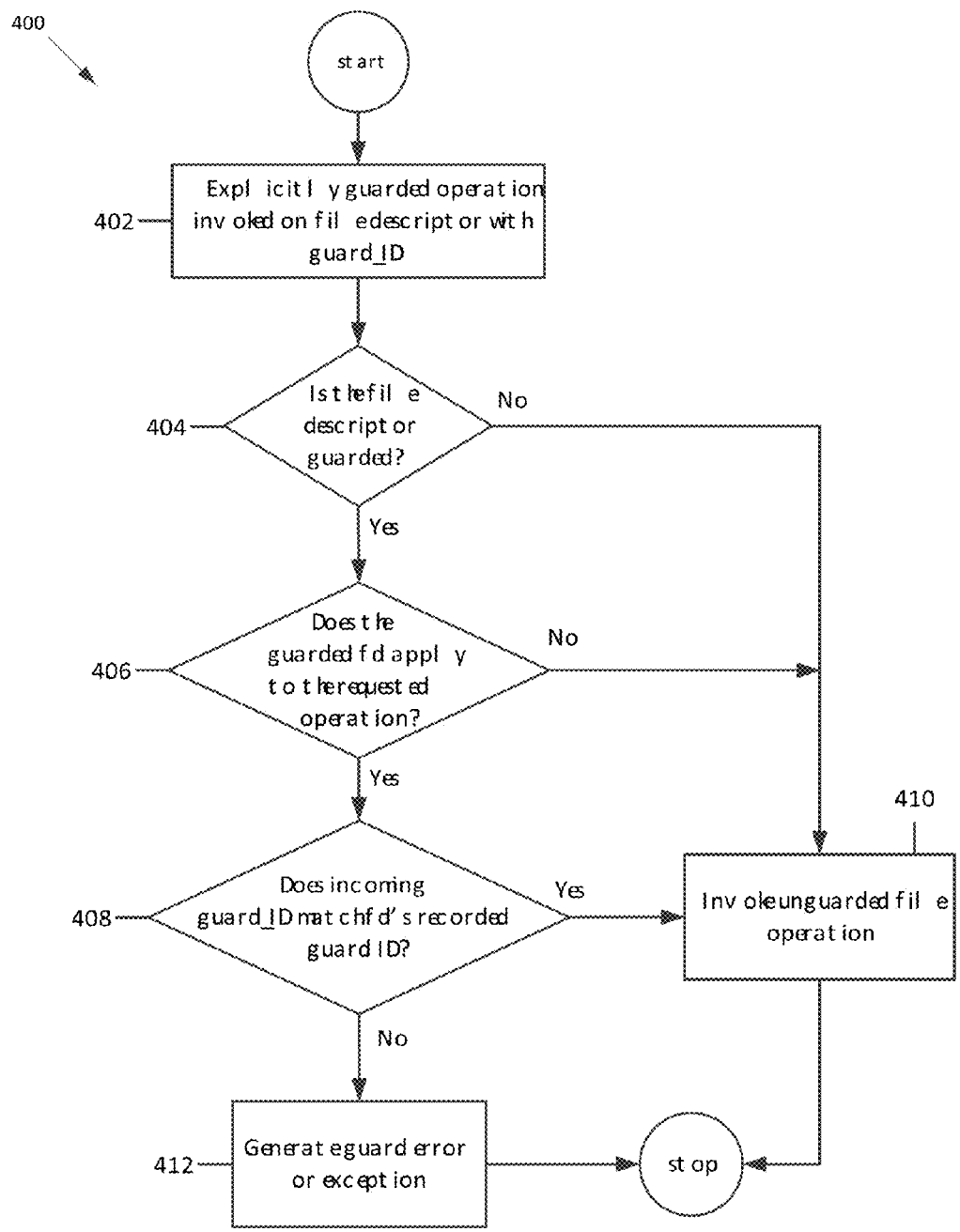
FIG. 4 shows a representative flow chart for an explicitly guarded file descriptor close process in accordance with the described embodiments.

FIG. 4 shows a representative flow chart for an explicitly guarded file descriptor close process in accordance with the described embodiments. Process 300 can be implemented as, for example, computer program code encoded on a computer readable medium and executable by a processor of a computer system. Process 300 can describe an attempt to perform a file access operation on a file descriptor using an explicitly guarded, function 110 such as a guarded_close function 114. At 402, when a program executing in an operating system process wants to perform the operation, the process invokes the appropriate one of the explicitly guarded functions 110 on the file's file descriptor, and is expected to supply the guard identifier associated with the file descriptor as a parameter to the function. At 404, a determination is made if the file descriptor is guarded. The determination can involve determining whether or not the file descriptor is associated with a guard identifier. The determination can be made by searching the guard table 122 for an entry in the file descriptor column 124 that matches the file descriptor received in the fd parameter 116, and determining if there is a guard identifier 126 associated with, e.g., in the same table row as, the file descriptor 124 in the table that matches the received fd parameter 116. If the file descriptor is not guarded, e.g., if there is no record of the received file descriptor in the guard table 122, then block 410 invokes the unguarded do_close operation 134 to close the file descriptor without checking any guards.

Otherwise, if block 404 determines that the file descriptor is guarded, block 406 determines whether the guarded file descriptor applies to the requested operation (e.g., close). Block 406 can, for example, check if the bit that corresponds to the requested operation is set in the guardflags value associated with the file descriptor that was passed to block 402. If the bit is set, then the guarded file descriptor fd applies to the requested operation, and block 408 is invoked to determine if the incoming guard_ID that was passed to the explicitly guarded function (e.g., guarded_close 114) in the parameters 116 at block 402 matches the guard ID that was recorded in the guard table 122 when the fd was opened as shown in FIG. 2. If so, block 410 invokes the appropriate one of the unguarded operations 130 (e.g., do_close 134) to perform the requested operation without performing any further guard checks. Otherwise, if block 406 determines that the guarded file descriptor does not apply to the request operation (e.g., because the corresponding operation flag was not specified when the file descriptor was opened with guarded_open), then block 410 invokes the unguarded do_close operation 134. After block 410 closes the file descriptor, the process ends. Otherwise, if block 408 determines that the incoming guard_ID does not match the file descriptor, then block 412 generates a guard error (e.g., EGUARD) or exception (e.g., guard mismatch) without performing the requested file operation, and the process ends. The error or exception can be used to identify the source or location in the application program code 104 that erroneously invoked the explicitly guarded function 110 with an inconsistent or incorrect file descriptor value so that the error can be corrected.

Figure 5:
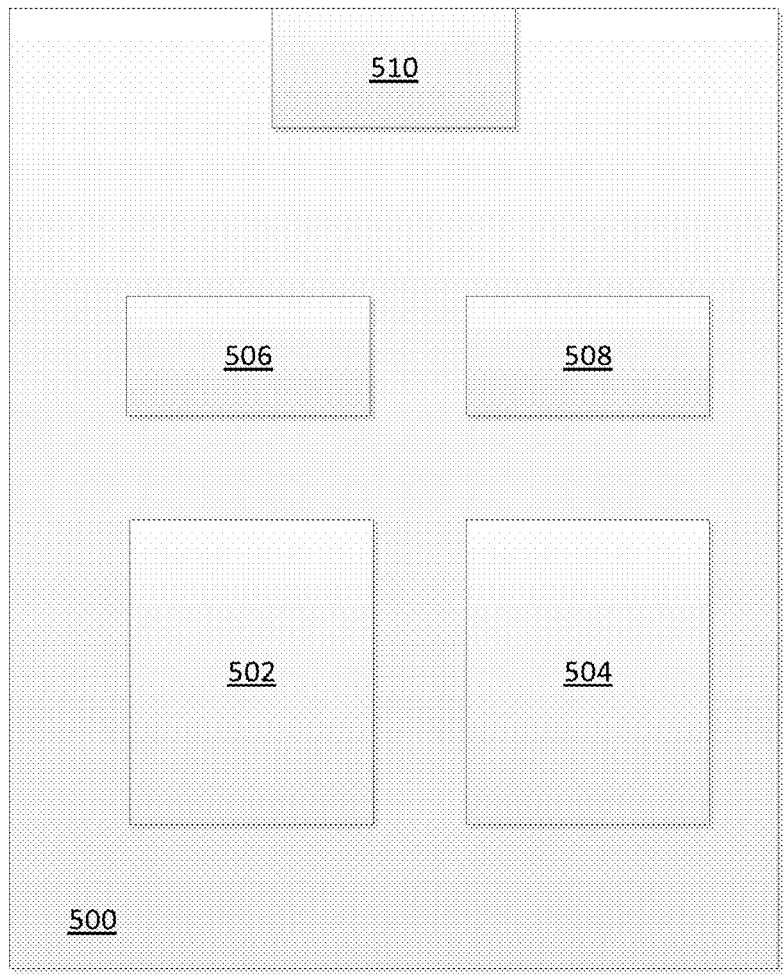
FIG. 5 shows a representative computing system in accordance with the described embodiments.

FIG. 5 shows a system block diagram of computer system 500 used to execute the software of an embodiment. Computer system 500 includes subsystems such as a central processor 502, system memory 504, fixed storage 506 (e.g., hard drive), removable storage 508 (e.g., FLASH), and network interface 510. The central processor 502, for example, can execute computer program code (e.g., an operating system) to implement the invention. An operating system is normally, but necessarily) resident in the system memory 504 during its execution. Other computer systems suitable for use with the invention may include additional or fewer subsystems. For example, another computer system could include more than one processor 502 (i.e., a multi-processor system) or a cache memory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method implemented by a computer system, the method comprising:
attempting to perform a file operation on a file descriptor, wherein attempting to perform the file operation comprises receiving the file descriptor and an incoming guard identifier;
when (i) the file descriptor has been previously associated with a guard identifier, and (ii) the file descriptor applies to the file operation being attempted on the file descriptor:
determining whether the incoming guard identifier is valid or invalid for the file descriptor, wherein:
the incoming guard identifier is invalid when a lookup table indicates the incoming guard identifier does not match the guard identifier previously associated with the file descriptor, and the incoming guard identifier is valid when the lookup table indicates the incoming guard identifier matches the guard identifier previously associated with the file descriptor;

when the incoming guard identifier is invalid for the file descriptor;

generating a guard violation without performing the file operation; and when the incoming guard identifier is valid for the file descriptor:

performing the file operation.

2. The method of claim 1, wherein the lookup table defines one or more associations between the file descriptor and the guard identifier, and the method further comprises:

comparing the incoming guard identifier with the guard identifier previously associated with the file descriptor in the lookup table to determine whether the incoming guard identifier matches the guard identifier previously associated with the file descriptor.

3. The method of claim 1, wherein the file operation comprises a particular type of file operation, and the method further comprises:

determining that the file descriptor applies to the file operation being attempted on the file descriptor when the file descriptor is associated with the particular type of file operation in the lookup table.

4. The method of claim 3, wherein the lookup table defines one or more associations between the file descriptor and one or more types of file operations to which the file descriptor applies.

5. The method of claim 1, wherein the file operation is selected from one or more of the following file operations:

closing the guarded file descriptor,
reading from the guarded file descriptor,
writing to the guarded file descriptor,
duplicating the guarded file descriptor,
sending the guarded file descriptor over a socket,
performing advisory locking on the guarded file descriptor,
clearing a close-on-exec flag of the guarded file descriptor, or
making the guarded file descriptor into a file port.

6. The method of claim 1, wherein generating the guard violation comprises:

logging an error in accordance with the guard violation, wherein logging the error comprises logging pertinent state data about the file descriptor and the file operation being attempted on the file descriptor.

7. The method of claim 6, wherein the pertinent state data comprises a stack trace identifying a location in program code of the attempt to perform the file operation.

8. The method of claim 6, wherein the error comprises:
an exception code configured to describe the file operation;
the guard identifier; and
a file descriptor number.

9. The method of claim 6, further comprising:
generating a guard exception in accordance with the guard violation, the guard exception including a guard exception code corresponding to the file operation.

10. The method of claim 9, wherein the guard exception code is identified in accordance with one or more of the following guard exception codes:
closing the guarded file descriptor,
reading from the guarded file descriptor,
writing to the guarded file descriptor,
duplicating the guarded file descriptor,
sending the guarded file descriptor over a socket,
performing advisory locking on the guarded file descriptor,
clearing a close-on-exec flag of the guarded file descriptor,
making the guarded file descriptor into a file port, or
invoking a guarded file descriptor operation with an incorrect guard identifier.

11. The method of claim 9, further comprising:
using the guard exception to capture a program state in accordance with the guard violation; and
using the captured program state to analyze a cause of the guard violation.

12. The method of claim 1, further comprising:
receiving a request to create a guard for the file descriptor prior to attempting to perform the file operation, wherein the request includes the file descriptor and the guard identifier; and
associating the guard identifier with the file descriptor in the lookup table.

13. The method of claim 12, wherein the request further comprises one or more file operations to be guarded, and the method further comprises:
associating the one or more file operations with the file descriptor in the lookup table.

14. The method of claim 1, further comprising:
performing a guarded open operation on a file prior to attempting to perform the file operation,
wherein performing the guarded open operation comprises doing the following atomically:
performing an unguarded open operation on the file descriptor, and
associating the file descriptor with the guard identifier.

15. A non-transitory computer readable medium storing instructions that, when executed by a processor, cause the processor to carry out the steps that include:
receiving an invocation of a file operation on a file descriptor;
receiving an incoming guard identifier associated with the invocation;
determining that a guard identifier has been previously associated with the file descriptor, wherein the guard identifier is previously associated with the file descriptor prior to receiving the invocation;
determining that the file descriptor applies to the file operation being invoked;
determining whether the incoming guard identifier is valid or invalid for the file descriptor, wherein:
the incoming guard identifier is invalid when a lookup table indicates the incoming guard identifier does not match the guard identifier previously associated with the file descriptor, and
the incoming guard identifier is valid when the lookup table indicates the incoming guard identifier matches the guard identifier previously associated with the file descriptor;
performing the file operation on the file descriptor when the incoming guard identifier is valid for the file descriptor; and
generating a guard violation without performing the file operation when the incoming guard identifier is invalid for the file descriptor.

16. The non-transitory computer readable medium of claim 15, wherein
the lookup table defines one or more associations between the file descriptor and the guard identifier, and the steps further include:

comparing the incoming guard identifier with the guard identifier previously associated with the file descriptor in the lookup table to determine whether the incoming guard identifier matches the guard identifier previously associated with the file descriptor.

17. A system comprising:
one or more processors, wherein the one or more processors are configured to:
  attempt to perform a file operation on a file descriptor, wherein the one or more processors are further configured to receive the file descriptor and an incoming guard identifier;
  determine that a guard identifier has been previously associated with the file descriptor based on a lookup table, wherein the lookup table defines one or more associations between the file descriptor and the guard identifier;
  determine that the file descriptor applies to the file operation being attempted on the file descriptor based on the lookup table, wherein the lookup table further defines one or more other associations between the file descriptor and one or more file operations to which the file descriptor applies;
  determine whether the incoming guard identifier is valid or invalid for the file descriptor, wherein
    the incoming guard identifier is invalid when the lookup table indicates the incoming guard identifier does not match the guard identifier previously associated with the file descriptor, and
    the incoming guard identifier is valid when the lookup table indicates the incoming guard identifier matches the guard identifier previously associated with the file descriptor;
  perform the file operation on the file descriptor when the incoming guard identifier is valid for the file descriptor; and
  prevent execution of the file operation when the incoming guard identifier is invalid for the file descriptor.

* * * * *